(12) United States Patent
Borgerson et al.

(10) Patent No.: US 9,039,556 B2
(45) Date of Patent: *May 26, 2015

(54) TRANSMISSION-INTEGRATED ELECTROMECHANICAL DEVICE

(71) Applicant: GM Global Technology Operations LLC, Detroit, MI (US)

(72) Inventors: James B. Borgerson, Clarkston, MI (US); Daryl A. Wilton, Macomb, MI (US); Edward W. Mellet, Rochester Hills, MI (US); James M. Hart, Belleville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 93 days.

This patent is subject to a terminal disclaimer.

(21) Appl. No.: 13/759,603

(22) Filed: Feb. 5, 2013

(65) Prior Publication Data

US 2014/0221142 A1 Aug. 7, 2014

(51) Int. Cl.
| | |
|---|---|
| *B60K 6/20* | (2007.10) |
| *F02N 11/04* | (2006.01) |
| *F16H 3/62* | (2006.01) |
| *F16H 3/66* | (2006.01) |
| *F16H 37/06* | (2006.01) |
| *F02N 15/02* | (2006.01) |
| *F02N 15/04* | (2006.01) |
| *B60K 6/365* | (2007.10) |

(52) U.S. Cl.
CPC ............... *F02N 11/04* (2013.01); *B60K 6/365* (2013.01); *F16H 3/62* (2013.01); *F16H 3/66* (2013.01); *F16H 37/065* (2013.01); *F16H 2200/0069* (2013.01); *F16H 2200/201* (2013.01); *F16H 2200/2012* (2013.01); *F16H 2200/2046* (2013.01); *F16H 2200/2048* (2013.01); *F16H 2200/0078* (2013.01); *F02N 15/022* (2013.01); *F02N 15/046* (2013.01)

(58) Field of Classification Search
CPC ............ B60K 3/365; F16H 2200/0069; F16H 2200/2012; F16H 2200/2046
USPC ....................... 475/5, 275–291, 330
See application file for complete search history.

(56) References Cited

U.S. PATENT DOCUMENTS

| | | | |
|---|---|---|---|
| 5,875,691 A * | 3/1999 | Hata et al. | 74/661 |
| 6,176,803 B1 | 1/2001 | Meyer et al. | |
| 6,342,026 B1 | 1/2002 | Takagi et al. | |
| 6,547,688 B2 | 4/2003 | Takagi et al. | |
| 6,558,287 B2 | 5/2003 | Hayabuchi et al. | |
| 6,634,980 B1 | 10/2003 | Ziemer | |

(Continued)

OTHER PUBLICATIONS

Pending U.S. Appl. No. 13/206,862, filed Aug. 10, 2011, by Mellet et al. All pages.

*Primary Examiner* — Roger Pang

(57) ABSTRACT

A transmission assembly for use in a motor vehicle is provided. The transmission assembly has a case for housing components of the transmission and an electromechanical device operable to convert mechanical energy to electrical energy. The electromechanical device is disposed within the transmission case. The case may have a main housing portion and a bell housing portion, with the electromechanical device housed in the main housing portion, in some variations. A transmission shaft may be rotatably supported within the case and configured to be connected to an engine of the motor vehicle. A connecting device may continuously interconnect the electromechanical device with the transmission shaft.

12 Claims, 8 Drawing Sheets

(56) References Cited

U.S. PATENT DOCUMENTS

| | | |
|---|---|---|
| 6,663,528 B1 | 12/2003 | Haka |
| 6,736,751 B1 | 5/2004 | Usoro et al. |
| 6,743,139 B1 | 6/2004 | Usoro et al. |
| 6,743,140 B1 | 6/2004 | Lee et al. |
| 6,743,142 B1 | 6/2004 | Lee et al. |
| 6,743,143 B1 | 6/2004 | Usoro et al. |
| 6,743,144 B1 | 6/2004 | Lee et al. |
| 6,746,357 B1 | 6/2004 | Usoro et al. |
| 6,752,736 B1 | 6/2004 | Lee et al. |
| 6,755,765 B2 | 6/2004 | Usoro et al. |
| 6,758,784 B2 | 7/2004 | Lee et al. |
| 6,758,787 B2 | 7/2004 | Usoro et al. |
| 6,764,424 B1 | 7/2004 | Usoro et al. |
| 6,764,425 B2 | 7/2004 | Lee et al. |
| 6,764,426 B2 | 7/2004 | Usoro et al. |
| 6,767,307 B1 | 7/2004 | Lee et al. |
| 6,802,795 B2 | 10/2004 | Miyazaki et al. |
| 6,811,512 B2 | 11/2004 | Usoro et al. |
| 6,837,823 B2 | 1/2005 | Lee et al. |
| 6,852,059 B2 | 2/2005 | Lee et al. |
| 6,960,149 B2 | 11/2005 | Ziemer |
| 6,984,187 B2 | 1/2006 | Biermann |
| 6,991,578 B2 | 1/2006 | Ziemer |
| 7,011,597 B2 | 3/2006 | Haka |
| 7,014,589 B2 | 3/2006 | Stevenson |
| 7,018,319 B2 | 3/2006 | Ziemer |
| 7,101,305 B2 | 9/2006 | Tabata et al. |
| 7,128,683 B2 | 10/2006 | Oguri et al. |
| 7,163,484 B2 | 1/2007 | Klemen |
| 7,771,305 B1 * | 8/2010 | Hart et al. ............ 475/282 |
| 8,506,442 B2 * | 8/2013 | Mellet et al. ............ 475/276 |
| 8,758,187 B2 * | 6/2014 | Mellet et al. ............ 475/280 |
| 8,840,520 B2 * | 9/2014 | Neelakantan et al. ............ 475/280 |
| 2005/0090362 A1 | 4/2005 | Abe et al. |
| 2006/0019791 A1 | 1/2006 | Baldwin |
| 2006/0270513 A1 | 11/2006 | Klemen |
| 2006/0270514 A1 | 11/2006 | Oguri et al. |
| 2006/0270516 A1 | 11/2006 | Klemen |
| 2010/0190600 A1 * | 7/2010 | Phillips et al. ............ 475/275 |
| 2010/0216589 A1 * | 8/2010 | Hart et al. ............ 475/275 |
| 2012/0178568 A1 * | 7/2012 | Schoenek et al. ............ 475/5 |
| 2012/0264555 A1 * | 10/2012 | Robinette et al. ............ 475/5 |
| 2013/0040776 A1 * | 2/2013 | Mellet et al. ............ 475/275 |
| 2013/0184111 A1 * | 7/2013 | Tsuchida et al. ............ 475/5 |
| 2013/0310211 A1 * | 11/2013 | Wilton et al. ............ 475/276 |
| 2014/0141925 A1 * | 5/2014 | Hart et al. ............ 475/276 |
| 2014/0221149 A1 * | 8/2014 | Wilton et al. ............ 475/276 |
| 2014/0248989 A1 * | 9/2014 | Hart et al. ............ 475/276 |
| 2014/0256500 A1 * | 9/2014 | Mellet et al. ............ 475/276 |

\* cited by examiner

| GEAR STATE | GEAR RATIO | RATIO STEP | TORQUE TRANSMITTING ELEMENTS ||||||
|---|---|---|---|---|---|---|---|---|
| | | | 132 | 130 | 134 | 136 | 128 | 126 |
| REV | -2.870 | | X | | | | | X |
| N | | -0.64 | | | | | | |
| 1ST | 4.455 | | X | | X | | | |
| 2ND | 2.912 | 1.53 | | X | X | | | |
| 3RD | 1.894 | 1.54 | | | X | | | X |
| 4TH | 1.446 | 1.31 | | | X | | X | |
| 5TH | 1.000 | 1.45 | | | | | X | X |
| 6TH | 0.851 | 1.18 | X | | | X | | |
| 7TH | 0.742 | 1.15 | | X | | | X | |
| 8TH | 0.609 | 1.22 | | | | | X | X |
| 9TH | 0.556 | 1.09 | | X | | X | | |
| 10TH | 0.505 | 1.10 | | | | | X | X |

X = ON - ENGAGED CARRYING TORQUE
O = ON - ENGAGED NOT CARRYING TORQUE

| GEAR STATE | GEAR RATIO | RATIO STEP | TORQUE TRANSMITTING ELEMENTS ||||||
|---|---|---|---|---|---|---|---|---|
| | | | 232 | 230 | 234 | 229 OR 236 | 228 | 226 |
| REV | -2.870 | | X | | | | | X |
| N | | -0.64 | | | | | | |
| 1ST | 4.455 | | X | | X | | | |
| 2ND | 2.912 | 1.53 | | X | X | | | |
| 3RD | 1.894 | 1.54 | | | X | | | X |
| 4TH | 1.446 | 1.31 | | | X | | X | |
| 5TH | 1.000 | 1.45 | | | | | X | X |
| 6TH | 0.851 | 1.18 | X | | | X | | |
| 7TH | 0.742 | 1.15 | | X | | | X | |
| 8TH | 0.609 | 1.22 | | | | X | X | |
| 9TH | 0.556 | 1.09 | | X | | X | | |
| 10TH | 0.505 | 1.10 | | | | X | | X |

X = ON - ENGAGED CARRYING TORQUE
O = ON - ENGAGED NOT CARRYING TORQUE

FIG. 8

| GEAR STATE | GEAR RATIO | RATIO STEP | TORQUE TRANSMITTING ELEMENTS ||||||| 
|---|---|---|---|---|---|---|---|---|---|
| | | | 334 | 332 | 336 | 338 | 328 | 326 | 330 |
| REV | -2.943 | | X | | | | | X | |
| N | | -0.64 | | | | | | | |
| 1ST | 4.584 | | X | | X | | | | |
| 2ND | 2.964 | 1.55 | | X | X | | | | |
| 3RD | 2.413 | 1.23 | | | X | | | | X |
| 4TH | 1.912 | 1.26 | | | X | | | X | |
| 5TH | 1.446 | 1.32 | | | X | | X | | |
| 6TH | 1.000 | 1.45 | | | | | X | X | |
| 7TH | 0.836 | 1.20 | X | | | X | | | |
| 8TH | 0.746 | 1.12 | | X | | | X | | |
| 9TH | 0.599 | 1.25 | | | | X | X | | |
| 10TH | 0.541 | 1.11 | | X | | X | | | |
| 11TH | 0.491 | 1.10 | | | | X | | X | |
| 12TH | 0.440 | 1.12 | | | | X | | | X |

X = ON - ENGAGED CARRYING TORQUE
O = ON - ENGAGED NOT CARRYING TORQUE

| GEAR STATE | GEAR RATIO | RATIO STEP | TORQUE TRANSMITTING ELEMENTS ||||||| 
|---|---|---|---|---|---|---|---|---|---|
| | | | 434 | 432 | 436 | 438 | 428 | 426 | 430 |
| REV | -2.943 | | X | | | | | X | |
| N | | -0.64 | | | | | | | |
| 1ST | 4.584 | | X | | X | | | | |
| 2ND | 2.964 | 1.55 | | X | X | | | | |
| 3RD | 2.413 | 1.23 | | | X | | | | X |
| 4TH | 1.912 | 1.26 | | | X | | | X | |
| 5TH | 1.446 | 1.32 | | | X | | X | | |
| 6TH | 1.000 | 1.45 | | | | | X | X | |
| 7TH | 0.902 | 1.11 | X | | | X | | | |
| 8TH | 0.746 | 1.21 | | X | | | X | | |
| 9TH | 0.632 | 1.18 | | | | | X | X | |
| 10TH | 0.583 | 1.08 | | X | | X | | | |
| 11TH | 0.526 | 1.11 | | | | X | | X | |
| 12TH | 0.475 | 1.11 | | | | X | | | X |

X = ON - ENGAGED CARRYING TORQUE
O = ON - ENGAGED NOT CARRYING TORQUE

TRANSMISSION-INTEGRATED ELECTROMECHANICAL DEVICE

FIELD

The invention relates generally to an electromechanical device for use in a transmission, and more specifically, an electromechanical device disposed in a transmission that may be used to start an engine and/or to convert mechanical energy to electrical energy.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness, and improved packaging, primarily reduced size and weight, is essentially constant.

Traditionally, a starter for an engine is mounted on the engine. An alternator is typically connected by the serpentine belt to the engine output. A regenerative braking system may use electric motors to convert kinetic energy from braking into electrical energy. Each of these devices takes up space within a vehicle, adding to the size, weight, and complexity of a vehicle.

Accordingly, there is a need for an improved, cost-effective, compact multiple speed transmission. In addition, vehicles with fewer components and reduced complexity and size are desired.

SUMMARY

A transmission is provided having an electromechanical device disposed therein. The electromechanical device may be operable to start the vehicle engine and/or to convert mechanical energy to electrical energy. For example, the electromechanical device may function as a starter, an alternator, and/or a regenerative braking generator.

In one variation, which may be combined with or separate from the other variations described herein, a transmission assembly for use in a motor vehicle is provided. The transmission assembly includes an electromechanical device operable to convert mechanical energy to electrical energy. The transmission assembly also has a transmission case including a main housing portion and a bell housing. The electromechanical device is fixed within the main housing portion of the transmission case.

In another variation, which may be combined with or separate from the other variations described herein, a transmission assembly for use in a motor vehicle is provided that includes a transmission, a transmission shaft, an electromechanical device, and a connecting device. The transmission has a case for housing components of the transmission. The transmission shaft is rotatably supported within the case, and the transmission shaft is configured to be connected to an engine of the motor vehicle. The electromechanical device is disposed in the transmission case. The electromechanical device is operable to convert mechanical energy to electrical energy. The connecting device continuously interconnects the electromechanical device with the transmission shaft.

The transmission assembly may also include an output member, first, second, third and fourth planetary gear sets each having first, second and third members, several interconnecting members, and six or more torque transmitting mechanisms.

For example, in one variation, which may be combined with or separate from the other variations described herein, a first interconnecting member continuously interconnects the first member of the first planetary gear set with the second member of the second planetary gear set. A second interconnecting member continuously interconnects the second member of the first planetary gear set with the third member of the third planetary gear set. A third interconnecting member continuously interconnects the third member of the first planetary gear set with the third member of the fourth planetary gear set. A fourth interconnecting member continuously interconnects the first member of the second planetary gear set with the second member of the fourth planetary gear set. A fifth interconnecting member continuously interconnects the third member of the second planetary gear set with the second member of the third planetary gear set. The six or more torque transmitting mechanisms are each selectively engageable to interconnect at least one of the first, second, and third members with at least one other of the first, second, third members and a stationary member. The six or more torque transmitting mechanisms are selectively engageable in combinations of at least two to establish at least ten forward speed ratios and at least one reverse speed ratio between the transmission shaft and the output member. The transmission shaft is configured as an input to the transmission to supply torque from the engine to the transmission, and it may also be configured as an output shaft when the electromechanical device is operated to start the vehicle engine.

In another variation, which may be combined with or separate from the other variations described herein, a transmission is provided that includes an electromechanical device. The electromechanical device operates as an alternator, an engine starter, and a regenerative braking generator. A rotating device shaft extends from the electromechanical device. A transmission case is provided that includes a main housing portion and a bell housing. The electromechanical device is fixed within the main housing portion of the transmission case. A transmission shaft is rotatably supported within the transmission case. The transmission shaft is configured to be connected to the engine of the motor vehicle. The transmission shaft is operable as an input to the transmission and as an output to the engine. A connecting device continuously interconnects the device shaft with the transmission shaft. The electromechanical device is configured to be cooled with automatic transmission fluid.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 8 is a truth table presenting the state of engagement of the various torque transmitting elements in each of the available forward and reverse speeds or gear ratios of the transmissions illustrated in FIGS. 6 and 7;

DETAILED DESCRIPTION

The following description is merely exemplary in nature and is not intended to limit the present disclosure, application, or uses.

In some forms of the present disclosure, a nine, ten, eleven, or twelve speed transmission is provided in a relatively small package by achieving nine, ten, eleven, or twelve forward speeds with four planetary gear sets, four brakes, and two or three clutches. In other variations, however, additional or fewer brakes, clutches, planetary gear sets, or other components may be used.

At the outset, it should be appreciated that some of the embodiments of the nine, ten, eleven, or twelve speed automatic transmissions of the present invention have an arrangement of permanent mechanical connections between the elements of the four planetary gear sets. As used herein, coupling or interconnection refers to a direct, continuous, and permanent coupling or interconnection, for example by a rigid member or shaft, between elements. Selective coupling or interconnection, on the other hand, refers to a selective coupling by a clutch or brake, where the clutch or brake can be engaged and disengaged, such that when engaged, the selectively coupled or interconnected elements rotate together, but when disengaged, the selectively coupled or interconnected elements are free to rotate independently.

In one embodiment, a first component or element of a first planetary gear set is permanently coupled to a second component or element of a second planetary gear set. A second component or element of the first planetary gear set is permanently coupled to a third component or element of a third planetary gear set. A third component or element of the first planetary gear set is permanently coupled to a third component or element of a fourth planetary gear set. A third component or element of the second planetary gear set is permanently coupled to a second component or element of the third planetary gear set. A first component or element of the second planetary gear set is permanently coupled to a second component or element of the fourth planetary gear set.

Figure 1:
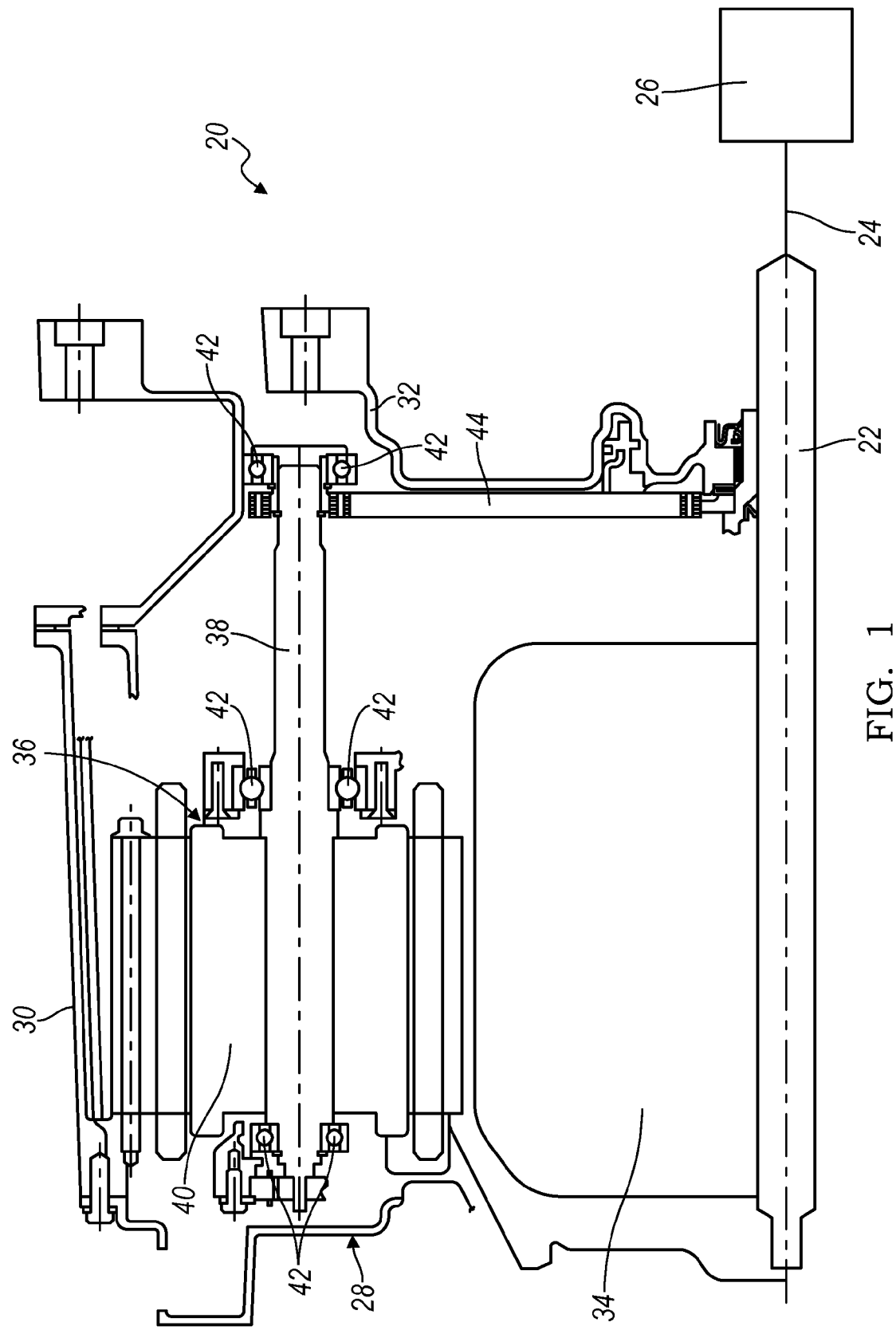
FIG. 1 is a side cross-sectional view of a portion of a transmission, in accordance with the principles of the present invention.

Referring now to FIG. 1, an embodiment of a portion of a transmission is illustrated and generally designated at 20. The transmission 20 has a transmission shaft 22 that is connected to an output shaft 24, such as a crankshaft, of an engine 26. As such, the transmission shaft 22 is a rotatable input to the transmission 20. The transmission shaft 22 is rotatably supported within the case 28 of the transmission 20. An electric motor (not shown) of a hybrid vehicle may also be included, if desired.

The transmission case 28 has both a main housing portion 30 and a bell housing 32. The main housing portion 30 of the transmission case 28 houses various components of the transmission. For example, a plurality of planetary gear sets (denoted by box 34), which are described in more detail in FIGS. 2-14, are located in the main housing portion 30 of the transmission case 28.

The transmission 20 has an electromechanical device 36 disposed therein. In this embodiment, the electromechanical device 36 is disposed in and fixed within the main housing portion 30 of the transmission case 28. The electromechanical device 36 is operable to convert mechanical energy to electrical energy, and it may also be operable to start the engine 26 of the motor vehicle. For example, the electromechanical device 36 may be a starter for the engine 26, an alternator, and/or a regenerative braking generator.

The electromechanical device 36 has a rotatable device shaft 38 extending from a main body portion 40 of the electromechanical device 36. The rotatable device shaft 38 may be supported within the transmission case 28 by bearings 42.

In embodiments where the electromechanical device 36 operates as an engine starter, the main body portion 40 contains an electric motor that turns the rotatable device shaft 38. A connecting device 44, such as a chain, belt, or gear drive, connects the rotatable device shaft 38 to the transmission shaft 22. Therefore, when used as a starter, the electromechanical device 36 turns the device shaft 38, which turns the connecting device 44. The connecting device 44 is coupled to the transmission shaft 22, causing the transmission shaft 22 to rotate with the connecting device 44 and the device shaft 38. The transmission shaft 22, which is coupled to the engine output shaft 24, turns the engine output shaft 24, which starts the engine 26. Accordingly, the engine 26 can be started from the electromechanical device 36 located in the transmission 20, rather than with a conventional starter bolted to the engine, if desired.

The electromechanical device 36 also may operate as an alternator, regenerative braking generator, or other device that converts mechanical energy to electrical energy. More specifically, the transmission shaft 22 rotates with the engine output shaft 24. When the engine 26 is not being started by the electromechanical device 36, the engine output shaft 24 is caused to rotate either from the power of the engine 26 or from motion of the wheels that causes the engine shaft 24 to rotate. When the engine output shaft 24 rotates, it causes the transmission shaft 22, the connecting device 44, and the device shaft 38 to rotate. The electromechanical device 36 can then be used to convert the mechanical energy from the rotating device shaft 38 into electrical energy. This electrical energy may then be stored in a vehicle battery (not shown), or used immediately to start the engine 26, to slow the vehicle down, or for another purpose. In this manner, the electromechanical device 36 can operate as an alternator or as a regenerative braking generator.

Thus, the transmission shaft 22 may be operable as both an input to the transmission 20 and as an output to the engine 26. In other words, when the electromechanical device 36 is used as a starter, the transmission shaft 22 is an output to the engine 26, where the motion of the transmission shaft 22 originates with the electromechanical device 36. When the engine 26 or vehicle motion is turning the engine output 24, however, the transmission shaft 22 operates as an input to the transmission 26; in that instance, the electromechanical device 36 can be used as a generator to convert the mechanical energy from the turning of the shafts/members 22, 24, 44, 38 to electrical energy. The electrical energy can be immediately used or stored in a battery.

The electromechanical device 36 can be cooled with transmission fluid. For example, transmission fluid can be directed from a central hub or a dedicated line to the electrical mechanical device 36 to cool it. As such, in some variations, the electromechanical device 36 need not have other cooling means.

Figure 2:
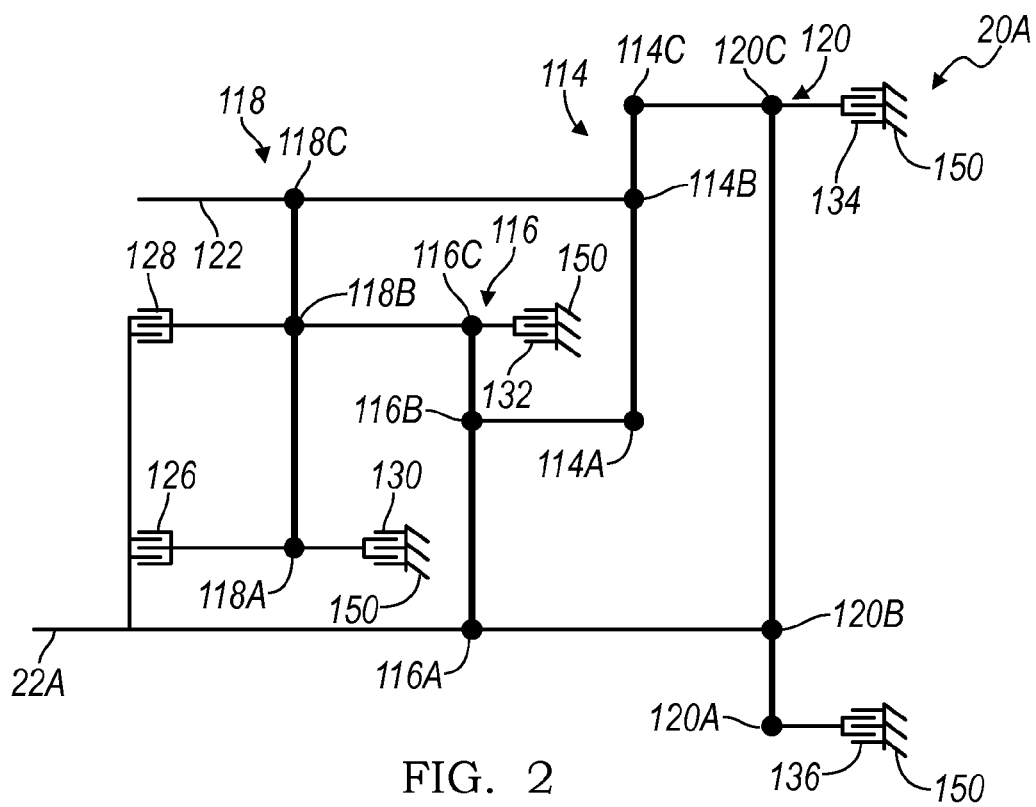
FIG. 2 is a lever diagram of an embodiment of a transmission according to the principles of the present invention.

Referring now to FIGS. 2-8, other components of the transmission 20 will be described. For example, a plurality of planetary gear sets and torque transmitting devices may be included in the transmission 20, as indicated by box 34 in FIG. 1. In FIG. 2, the transmission 20 is illustrated as a ten speed transmission in a lever diagram format, and this variation of the transmission is labeled as transmission 20A. It should be understood that the portions of the transmission 20A illustrated in FIG. 2 may be used with the portions of the transmission 20 illustrated in FIG. 1.

A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 20A includes the transmission shaft 22A (which is a transmission input member 22, as described above, that can also be used as an output when the electromechanical device 36 operates to start the engine 26), a first planetary gear set 114, a second planetary gear set 116, a third planetary gear set 118 and a fourth planetary gear set 120 and an output shaft or member 122. In the lever diagram of FIG. 2, the first planetary gear set 114 has three nodes: a first node 114A, a second node 114B and a third node 114C. The second planetary gear set 116 has three nodes: a first node 116A, a second node 116B and a third node 116C. The third planetary gear set 118 has three nodes: a first node 118A, a second node 118B and a third node 118C. The fourth planetary gear set 120 has three nodes: a first node 120A, a second node 120B and a third node 120C.

The input transmission shaft 22A is continuously coupled to the first node 116A of the second planetary gear set 116 and the second node 120B of the fourth planetary gear set 120. The output member 122 is coupled to the third node 118C of the third planetary gear set 118 and the second node 114B of the first planetary gear set 114. The first node 114A of the first planetary gear set 114 is coupled to the second node 116B of the second planetary gear set 116. The second node 114B of the first planetary gear set 114 is coupled to the third node 118C of the third planetary gear set 118. The third node 114C of the first planetary gear set 114 is coupled to the third node 120C of the fourth planetary gear set 120. The third node 116C of the second planetary gear set 116 is coupled to second node 118B of the third planetary gear set 118.

A first clutch 126 selectively connects the input transmission shaft 22A, the first node 116A of the second planetary gear set 116 and the second node 120B of the fourth planetary gear set 120 with the first node 118A of the third planetary gear set 118. A second clutch 128 selectively connects the input transmission shaft 22A, the first node 116A of the second planetary gear set 116 and the second node 120B of the fourth planetary gear set 120 with the second node 118B of the third planetary gear set 118. A first brake 130 selectively connects the first node 118A of the third planetary gear set 118 with a stationary member or transmission housing 150. A second brake 132 selectively connects the third node 116C of the second planetary gear set 116 and the second node 118B of the third planetary gear set 118 with the stationary member or transmission housing 150. A third brake 134 selectively connects the third node 114C of the first planetary gear set 114 and the third node 120C of the fourth planetary gear set 120 with the stationary member or transmission housing 150. A fourth brake 136 selectively connects the first node 120A of the fourth planetary gear set 120 with the stationary member or transmission housing 150.

Figure 3:
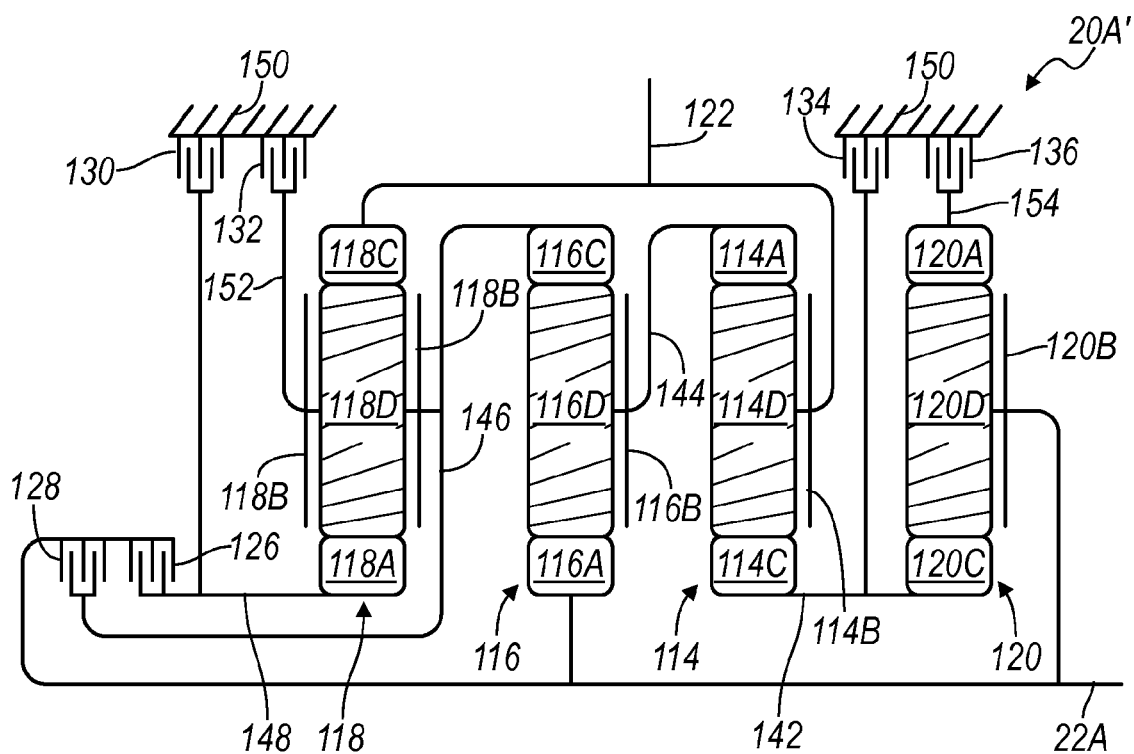
FIG. 3 is a diagrammatic illustration of an embodiment of a transmission according to the principles of the present invention.

Referring now to FIG. 3, a stick diagram presents a schematic layout of an embodiment of the ten speed transmission 20A according to the present invention. In FIG. 3, the numbering from the lever diagram of FIG. 2 is carried over, except that the transmission is labeled as 20A' to indicate that the transmission 20A' is merely one embodiment of a transmission stemming from the transmission 20A of FIG. 2. The clutches and couplings are correspondingly presented whereas the nodes of the planetary gear sets now appear as components of planetary gear sets such as sun gears, ring gears, planet gears and planet gear carriers.

For example, the planetary gear set 114 includes a sun gear member 114C, a ring gear member 114A and a planet gear carrier member 114B that rotatably supports a set of planet gears 114D (only one of which is shown). The sun gear member 114C is connected for common rotation with a first shaft or interconnecting member 142. The ring gear member 114A is connected for common rotation with a second shaft or interconnecting member 144. The planet carrier member 114B is connected for common rotation with the output shaft or member 122. The planet gears 114D are each configured to intermesh with both the sun gear member 114C and the ring gear member 114A.

The planetary gear set 116 includes a sun gear member 116A, a ring gear member 116C and a planet gear carrier member 116B that rotatably supports a set of planet gears 116D (only one of which is shown). The sun gear member 116A is connected for common rotation with the input transmission shaft 22A. The ring gear member 116C is connected for common rotation with a third shaft or interconnecting member 146. The planet carrier member 116B is connected for common rotation with the second shaft or interconnecting member 144. The planet gears 116D are each configured to intermesh with both the sun gear member 116A and the ring gear member 116C.

The planetary gear set 118 includes a sun gear member 118A, a ring gear member 118C and a planet gear carrier member 118B that rotatably supports a set of planet gears 118D (only one of which is shown). The sun gear member 118A is connected for common rotation with a fourth shaft or interconnecting member 148. The ring gear member 118C is connected for common rotation with the output shaft or member 122. The planet carrier member 118B is connected for common rotation with the third shaft or interconnecting member 146 and a fifth shaft or interconnecting member 152. The planet gears 118D are each configured to intermesh with both the sun gear member 118A and the ring gear member 118C.

The planetary gear set 120 includes a sun gear member 120C, a ring gear member 120A and a planet gear carrier member 120B that rotatably supports a set of planet gears 120D (only one of which is shown). The sun gear member 120C is connected for common rotation with the first shaft or interconnecting member 142. The ring gear member 120A is connected for common rotation with a sixth shaft or interconnecting member 154. The planet carrier member 120B is connected for common rotation with the input transmission shaft 22A. The planet gears 120D are each configured to intermesh with both the sun gear member 120C and the ring gear member 120A. The output shaft or member 122 is continuously connected with the final drive unit or transfer case (not shown).

The torque-transmitting mechanisms or clutches 126, 128 and brakes 130, 132, 134 and 136 allow for selective interconnection of the shafts or interconnecting members, members of the planetary gear sets and the housing. For example, the first clutch 126 is selectively engageable to connect the input transmission shaft 22A with the fourth shaft or interconnecting member 148. The second clutch 128 is selectively engageable to connect the input transmission shaft 22A with the third shaft or interconnecting member 146. The first brake 130 is selectively engageable to connect the fourth shaft or interconnecting member 148 with the stationary element or the transmission housing 150 in order to restrict the member 148 from rotating relative to the transmission housing 150. The second brake 132 is selectively engageable to connect the fifth shaft or interconnecting member 152 with the stationary element or the transmission housing 150 in order to restrict the member 152 from rotating relative to the transmission housing 150. The third brake 134 is selectively engageable to connect the first shaft or interconnecting member 142 with the stationary element or the transmission housing 150 in order to restrict the member 142 from rotating relative to the transmission housing 150. The fourth brake 136 is selectively engageable to connect the sixth shaft or interconnecting member 154 with the stationary element or the transmission housing 150 in order to restrict the member 154 from rotating relative to the transmission housing 150.

Figures 4, 5:
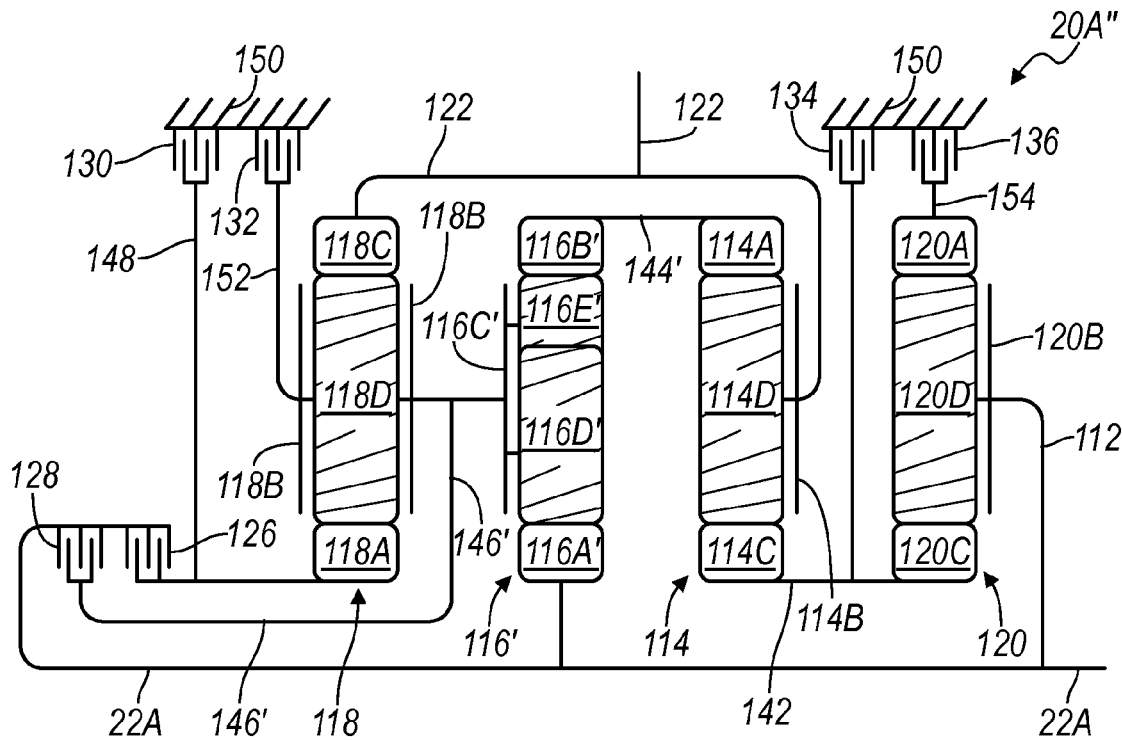
FIG. 4 is a diagrammatic illustration of another embodiment of a transmission according to the principles of the present invention.
FIG. 5 is a truth table presenting the state of engagement of the various torque transmitting elements in each of the available forward and reverse speeds or gear ratios of the transmissions illustrated in FIGS. 2-4.

Referring now to FIG. 3 and FIG. 5, the operation of the embodiment of the ten speed transmission 20A' will be described. It will be appreciated that transmission 20A' is capable of transmitting torque from the input shaft or member 22A to the output shaft or member 122 in at ten forward speed torque ratios and at least one reverse speed or torque ratio. Each forward and reverse speed or torque ratio is attained by engagement of one or more of the torque-transmitting mechanisms (i.e. first clutch 126, second clutch 128, first brake 130, second brake 132, third brake 134 and fourth brake 136), as will be explained below. FIG. 5 is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque (no "O"'s used in this table). Actual numerical gear ratios of the various gear states are also presented although it should be appreciated that these numerical values are exemplary only and that they may be adjusted over significant ranges to accommodate various applications and operational criteria of the transmission 20A'. Of course, other gear ratios are achievable depending on the gear diameter, gear teeth count and gear configuration selected.

For example to establish a reverse gear, first clutch 126 and second brake 132 are engaged or activated. The first clutch 126 connects the input shaft 22A with the fourth shaft or interconnecting member 148. The second brake 132 connects the fifth shaft or interconnecting member 152 with the stationary element or the transmission housing 150 in order to restrict the member 152 from rotating relative to the transmission housing 150. Likewise, the ten forward ratios are achieved through different combinations of clutch and brake engagement, as shown in FIG. 5.

It will be appreciated that the foregoing explanation of operation and gear states of the ten speed transmission 20A' assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

In another embodiment of the present disclosure, a ten speed transmission 20A" is provided and illustrated schematically in FIG. 4. The transmission 20A" in FIG. 4 is another embodiment of the transmission of FIGS. 1 and 2. Thus, the various components shown and described in FIG. 1 may be present with the gear configuration illustrated in FIG. 4. The transmission 20A" has the same number of planetary gear sets, clutches, brakes and interconnecting members, input and output shafts or members as shown in FIG. 3, as indicated by like reference numbers. However, transmission 20A" provides a second planetary gear set 116' that includes a planet carrier 116C' that supports two sets of planet gears 116D' and 116E'. For example, the planetary gear set 116' includes a sun gear member 116A', a ring gear member 116B' and a planet gear carrier member 116C' that rotatably supports the first and second set of planet gears 116D' and 116E' (only one of each is shown). The sun gear member 116A' is connected for common rotation with the input shaft 22A. The ring gear member 116B' is connected for common rotation with the second shaft or interconnecting member 144'. The second shaft or interconnecting member 144' is also connected to ring gear 114A of the first planetary gear set. The planet carrier member 116C' is connected for common rotation with the third shaft or interconnecting member 146'. The third shaft or interconnecting member 146' is also connected to carrier gear 118B of the third planetary gear set 118 and to the second clutch 128. The first set of planet gears 116D' are each configured to intermesh with both the sun gear member 116A' and the second set of planet gears 116E'. The second set of planet gears 116E' are each configured to intermesh with both the ring gear member 116B' and the first set of planet gears 116D'.

The planetary gear sets 114, 118 and 120 are configured as described with respect to transmission 20A, 20A' in FIGS. 2-3. Moreover, the clutches 126, 128 and brakes 130, 132, 134, 136 are configured as described with respect to the transmission in FIGS. 2-3. As mentioned above, the interconnecting members 142, 148, 152 and 154, are also configured as described with respect to transmission in FIGS. 2-3 above with the exception of interconnecting members 146' and 144'.

Referring now to FIGS. 4-5, the operation of the embodiment of the ten speed transmission 20A" will be described. It will be appreciated that transmission 20A" is capable of transmitting torque from the input shaft or member 22A to the output shaft or member 122 in at least ten forward speed or torque ratios and at least one reverse speed or torque ratio. Each forward and reverse speed or torque ratio is attained by engagement of one or more of the torque-transmitting mechanisms (i.e. first clutch 126, second clutch 128, first brake 130, second brake 132, third brake 134 and fourth brake 136), as will be explained below. To establish a tenth gear, first clutch 126 and fourth brake 136 are engaged or activated. The first clutch 126 connects the input shaft 22 with the fourth shaft or interconnecting member 148. The fourth brake 136 connects the sixth shaft or interconnecting member 154 with the stationary element or the transmission housing 150 in order to restrict the member 154 from rotating relative to the transmission housing 150. Likewise, the reverse and remaining nine forward ratios are achieved through different combinations of clutch and brake engagement, as shown in FIG. 5.

Figure 6:
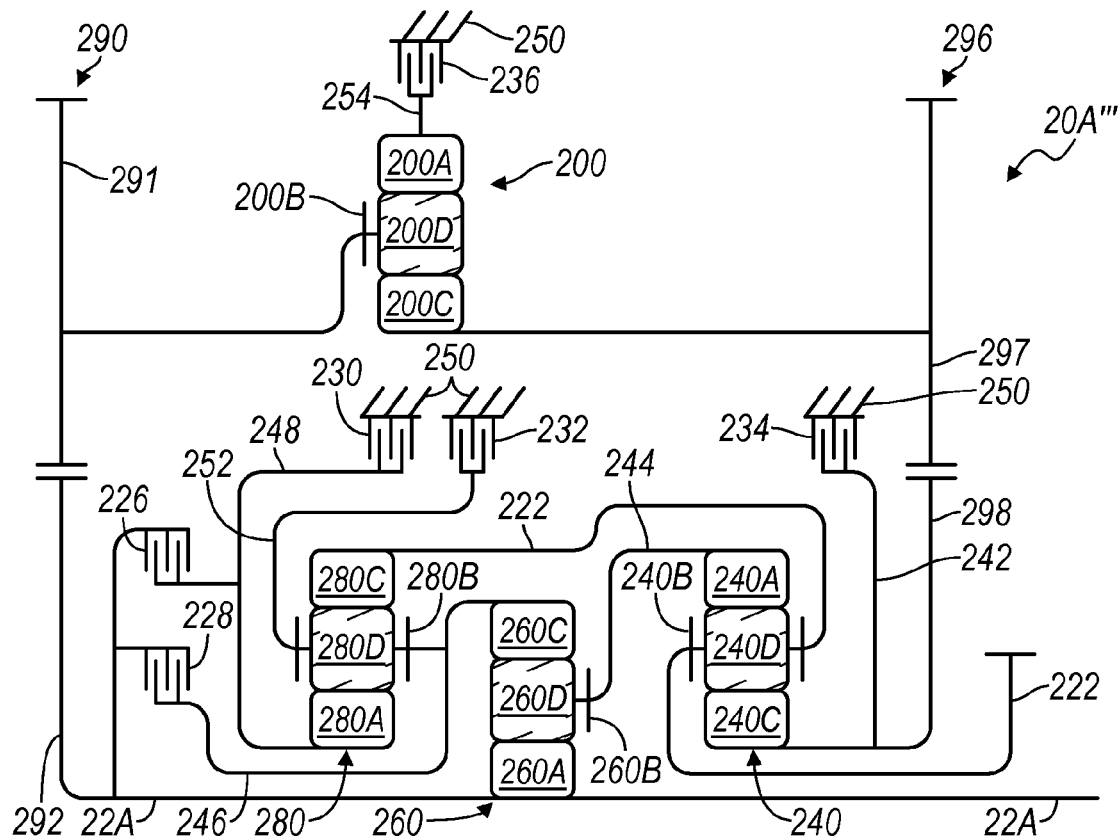
FIG. 6 is a diagrammatic illustration of another embodiment of a transmission according to the principles of the present invention.

In yet another embodiment of the present disclosure, another ten speed transmission 20A''' is provided and illustrated schematically in FIG. 6. Ten speed transmission 20A''' includes four planetary gear sets, 240, 260, 280 and 200 and two pairs of external gear sets 290, 296. External gear set 290 has a first gear 291 that intermeshes with a second gear 292. External gear set 296 has a first gear 297 that intermeshes with a second gear 298.

For example, the planetary gear set 240 includes a sun gear member 240C, a ring gear member 240A and a planet gear carrier member 240B that rotatably supports a set of planet gears 240D (only one of which is shown). The sun gear member 240C is connected for common rotation with a first shaft or interconnecting member 242 and with the second gear 298 of the second external gear set 296. The ring gear member 240A is connected for common rotation with a second shaft or interconnecting member 244. The planet carrier member 240B is connected for common rotation with the output shaft or member 222. The planet gears 240D are each configured to intermesh with both the sun gear member 240C and the ring gear member 240A.

The planetary gear set 260 includes a sun gear member 260A, a ring gear member 260C and a planet gear carrier member 260B that rotatably supports a set of planet gears 260D (only one of which is shown). The sun gear member 260A is connected for common rotation with the input shaft 22A and the second gear 292 of the first external gear set 290. The ring gear member 260C is connected for common rotation with a third shaft or interconnecting member 246. The planet carrier member 260B is connected for common rotation with the second shaft or interconnecting member 244. The planet gears 260D are each configured to intermesh with both the sun gear member 260A and the ring gear member 260C.

The planetary gear set 280 includes a sun gear member 280A, a ring gear member 280C and a planet gear carrier member 280B that rotatably supports a set of planet gears 280D (only one of which is shown). The sun gear member 280A is connected for common rotation with a fourth shaft or interconnecting member 248. The ring gear member 280C is connected for common rotation with the output shaft or member 222. The planet carrier member 280B is connected for common rotation with the third shaft or interconnecting member 246 and with a fifth shaft or interconnecting member 252. The planet gears 280D are each configured to intermesh with both the sun gear member 280A and the ring gear member 280C.

The planetary gear set 200 includes a sun gear member 200C, a ring gear member 200A and a planet gear carrier member 200B that rotatably supports a set of planet gears 200D (only one of which is shown). The sun gear member 200C is connected for common rotation with the first gear 297 of the second external gear set 296. The ring gear member 200A is connected for common rotation with a fourth clutch 236, as more fully described below. The planet carrier member 200B is connected for common rotation with the first gear 291 of the first external gear set 290. The planet gears 200D are each configured to intermesh with both the sun gear member 200C and the ring gear member 200A.

Figure 7:
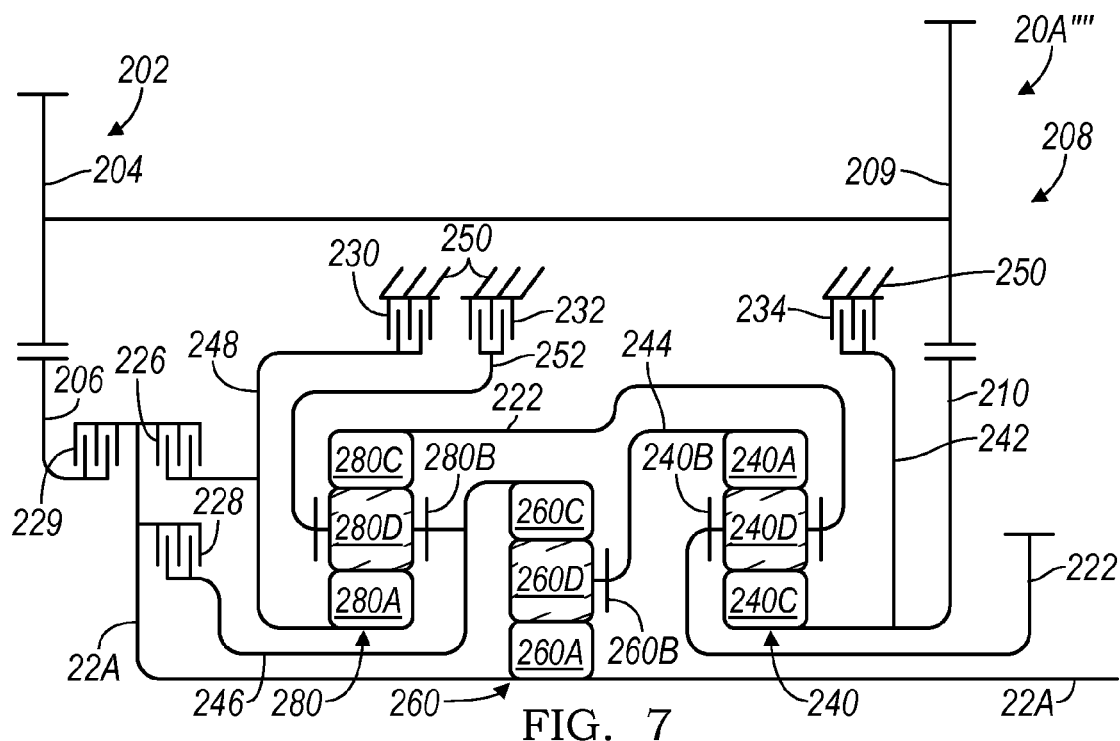
FIG. 7 is a diagrammatic illustration of yet another embodiment of a transmission according to the principles of the present invention.

In yet another embodiment of the present invention, another ten speed transmission 20A'''' is provided and illustrated schematically in FIG. 7. Ten speed transmission 20A'''' includes three of the four planetary gear sets of transmission 20A'''. Namely, planetary gear sets 240, 260 and 280 and further includes two pairs of external gear sets 202, 208. External gear set 202 has a first gear 204 that intermeshes with a second gear 206. External gear set 208 has a first gear 209 that intermeshes with a second gear 210. Moreover, the fourth brake 236 has been replaced with a third clutch 229. The third clutch 229 connects the input shaft 22A with the second gear of the second external gear set 202. Further, the external gear sets 202 and 208 have gear diameters and gear pitches predefined to establish the gear ratios. Advantageously, the fourth planetary gear set 200 of the previous embodiment is eliminated.

The torque-transmitting mechanisms or clutches 226, 228 and brakes 230, 232, 234 and 236 allow for selective interconnection of the shafts or interconnecting members, members of the planetary gear sets and the housing. For example, the first clutch 226 is selectively engageable to connect the input shaft 22A with the fourth shaft or interconnecting member 248. The second clutch 228 is selectively engageable to connect the input shaft 22A with the third shaft or interconnecting member 246. The first brake 230 is selectively engageable to connect the fourth shaft or interconnecting member 248 with the stationary element or the transmission housing 250 in order to restrict the member 248 from rotating relative to the transmission housing 250. The second brake 232 is selectively engageable to connect the fifth shaft or interconnecting member 252 with the stationary element or the transmission housing 250 in order to restrict the member 252 from rotating relative to the transmission housing 250. The third brake 234 is selectively engageable to connect the first shaft or interconnecting member 242 with the stationary element or the transmission housing 250 in order to restrict the member 242 from rotating relative to the transmission housing 250. The fourth brake 236 is selectively engageable to connect the sixth shaft or interconnecting member 254 with the stationary element or the transmission housing 250 in order to restrict the member 254 from rotating relative to the transmission housing 250.

Referring now to FIGS. 6-8, the operation of the embodiment of the ten speed transmissions 20A''' and 20A'''' will be described. It will be appreciated that transmissions 20A''', 20A'''' are capable of transmitting torque from the input shaft 22A to the output shaft or member 222 in at least ten forward speed or torque ratios and at least one reverse speed or torque ratio. Each forward and reverse speed or torque ratio is attained by engagement of one or more of the torque-transmitting mechanisms (i.e. first clutch 226, second clutch 228, third clutch 229, first brake 230, second brake 232, third brake 234 and fourth brake 236), as will be explained below. FIG. 8 is a truth table presenting an example of various combinations of torque-transmitting mechanisms that are activated or engaged to achieve the various gear states. With respect to transmission 202 a tenth gear ratio is established by engaging first clutch 126 and fourth brake 136 are engaged or activated. The first clutch 126 connects the input shaft or member 120 with the fourth shaft or interconnecting member 148. The fourth brake 136 connects the sixth shaft or interconnecting member 154 with the stationary element or the transmission housing 150 in order to restrict the member 154 from rotating relative to the transmission housing 150. Likewise, the reverse and remaining nine forward ratios are achieved through different combinations of clutch and brake engagement, as shown in FIG. 8.

With respect to transmission 20A'''', a tenth gear ratio is established by engaging first clutch 226 and third clutch 229 are engaged or activated. The first clutch 226 connects the input shaft 22A with the fourth shaft or interconnecting member 248. The third clutch 229 connects the input shaft or interconnecting member 220 with the second gear of the second external gear set 202. Likewise, the reverse and remaining nine forward ratios are achieved through different combinations of clutch and brake engagement, as shown in FIG. 8.

Figure 9:
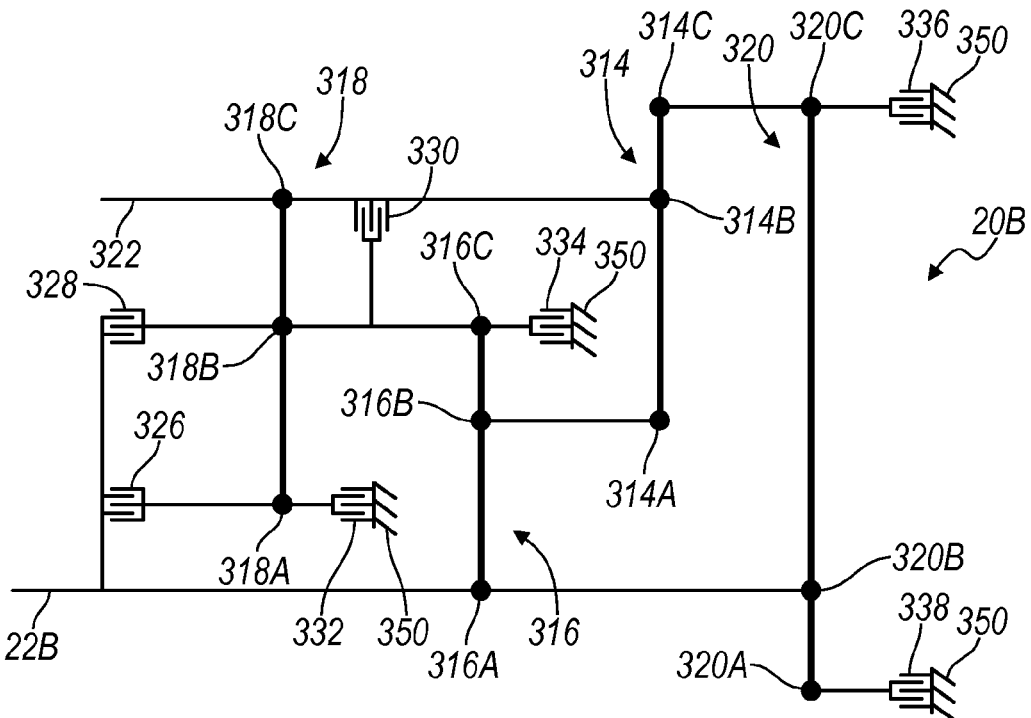
FIG. 9 is a lever diagram of another embodiment of a transmission according to the principles of present invention.

Referring to FIG. 9, an embodiment of a twelve speed variation of the transmission 20 of FIG. 1 is illustrated in a lever diagram format and generally designated at 20B. The transmission 10 includes the input shaft or member 22B, a first planetary gear set 314, a second planetary gear set 316, a third planetary gear set 318, a fourth planetary gear set 320, and an output shaft or member 322. In the lever diagram of FIG. 9, the first planetary gear set 314 has three nodes: a first node 314A, a second node 314B, and a third node 314C. The second planetary gear set 316 has three nodes: a first node 316A, a second node 316B and a third node 316C. The third planetary gear set 318 has three nodes: a first node 318A, a second node 318B and a third node 318C. The fourth planetary gear set 320 has three nodes: a first node 320A, a second node 320B and a third node 320C.

The input member 22B is continuously coupled to the first node 316A of the second planetary gear set 316 and the second node 320B of the fourth planetary gear set 320. The output member 322 is continuously coupled to the third node 318C of the third planetary gear set 318 and the second node 314B of the first planetary gear set 314.

The first node 314A of the first planetary gear set 314 is coupled to the second node 316B of the second planetary gear set 316. The second node 314B of the first planetary gear set 314 is coupled to the third node 318C of the third planetary gear set 318. The third node 314C of the first planetary gear set 314 is coupled to the third node 320C of the fourth planetary gear set 320.

The first node 316A of the second planetary gear set 316 is coupled to the second node 320B of the fourth planetary gear set 320. The third node 316C of the second planetary gear set 316 is coupled to second node 318B of the third planetary gear set 318.

A first clutch 326 selectively connects the input member or shaft 22B, the first node 316A of the second planetary gear set 316, and the second node 320B of the fourth planetary gear set 320 with the first node 318A of the third planetary gear set 318. A second clutch 328 selectively connects the input member 22B, the first node 316A of the second planetary gear set 316, and the second node 320B of the fourth planetary gear set 320 with the second node 318B of the third planetary gear set 318 and the third node 316C of the second planetary gear set 316. A third clutch 330 selectively connects the output member or shaft 322, the third node 318C of the third planetary gear set 318, and the second node 314B of the first planetary gear set 314 with the third node 316C of the second planetary gear set 316 and the second node 318B of the third planetary gear set 318.

A first brake 332 selectively connects the first node 318A of the third planetary gear set 318 with a stationary member or transmission housing 350. A second brake 334 selectively connects the third node 316C of the second planetary gear set 316 and the second node 318B of the third planetary gear set 318 with the stationary member or transmission housing 350. A third brake 336 selectively connects the third node 314C of the first planetary gear set 314 and the third node 320C of the fourth planetary gear set 320 with the stationary member or transmission housing 350. A fourth brake 338 selectively connects the first node 320A of the fourth planetary gear set 320 with the stationary member or transmission housing 350.

Figure 10:
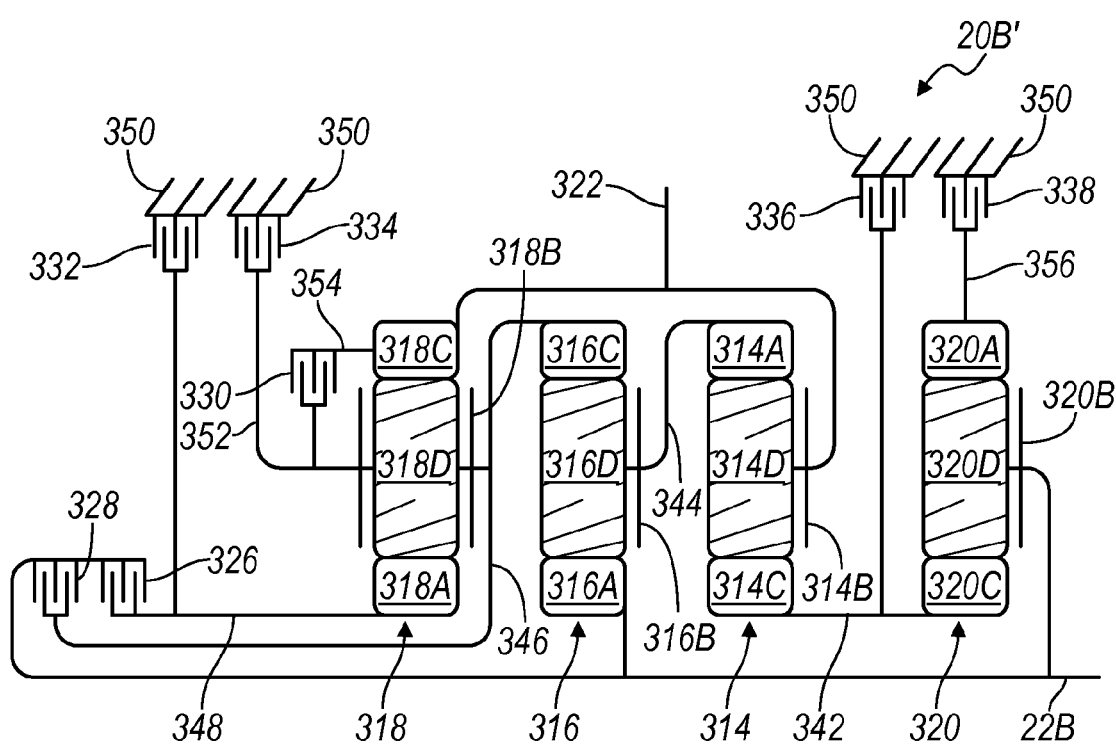
FIG. 10 is a diagrammatic illustration of a variation of the transmission of FIG. 9 according to the principles of the present invention.

Referring now to FIG. 10, a stick diagram presents a schematic layout of an embodiment of the twelve speed transmission 20B according to one form of the present invention, and is labeled as transmission 20B'. In FIG. 10, the numbering from the lever diagram of FIG. 9 is carried over. The clutches and couplings are correspondingly presented whereas the nodes of the planetary gear sets now appear as components of planetary gear sets such as sun gears, ring gears, planet gears and planet gear carriers.

For example, the first planetary gear set 314 includes a first sun gear member 314C, a first ring gear member 314A, and a first planet gear carrier member 314B that rotatably supports a first set of planet gears 314D (only one of which is shown). The first planetary gear set 314 is a simple planetary gear set in this variation, but in other variations of the present invention, the first planetary gear set 314 could be a compound planetary gear set. The first sun gear member 314C is connected for common rotation with a first shaft or interconnecting member 342. The first ring gear member 314A is connected for common rotation with a second shaft or interconnecting member 344. The first planet carrier member 314B is connected for common rotation with the output shaft or member 322. The first planet gears 314D are each configured to intermesh with both the first sun gear member 314C and the first ring gear member 314A.

The second planetary gear set 316 includes a second sun gear member 316A, a second ring gear member 316C, and a second planet gear carrier member 316B that rotatably supports a second set of planet gears 316D (only one of each is shown). The second planetary gear set 316 is a simple planetary gear set in this variation, but in other variations of the present invention, the second planetary gear set 316 could be a compound planetary gear set having more than one set of planetary gears supported by the carrier member 316B. The second sun gear member 316A is connected for common rotation with the input transmission shaft 22B. The second planet carrier member 316B is connected for common rotation with the second shaft or interconnecting member 344. The second ring gear member 316C is connected for common rotation with a third shaft or interconnecting member 346. The second set of planet gears 316D is configured to intermesh with both the second ring gear member 316C and the second sun gear member 316A.

The third planetary gear set 318 includes a third sun gear member 318A, a third ring gear member 318C, and a third planet gear carrier member 318B that rotatably supports a third set of planet gears 318D (only one of which is shown). In other words, the third planetary gear set 318 is a simple planetary gear set in this variation, but in other variations of the present invention, the third planetary gear set 318 could be a compound planetary gear set. The third sun gear member 318A is connected for common rotation with a fourth shaft or interconnecting member 348. The third planet carrier member 318B is connected for common rotation with the third shaft or interconnecting member 346 and a fifth shaft or interconnecting member 352. The third ring gear member 318C is connected for common rotation with the output shaft or member 322. In addition, the third ring gear member 318C is connected for common rotation with a sixth shaft or interconnecting member 354. The third planet gears 318D are each configured to intermesh with both the third sun gear member 318A and the third ring gear member 318C.

The fourth planetary gear set 320 includes a fourth sun gear member 320C, a fourth ring gear member 320A, and a fourth planet gear carrier member 320B that rotatably supports a fourth set of planet gears 320D (only one of which is shown). In other words, the fourth planetary gear set 320 is a simple planetary gear set in this variation, but in other variations of the present invention, the fourth planetary gear set 320 could be a compound planetary gear set. The fourth sun gear member 320C is connected for common rotation with the first shaft or interconnecting member 342. The fourth ring gear member 320A is connected for common rotation with a seventh shaft or interconnecting member 356. The fourth planetary gear carrier member 320B is connected for common rotation with the input shaft 22B. The fourth planet gears 320D are each configured to intermesh with both the fourth sun gear member 320C and the fourth ring gear member 320A. The output shaft or member 322 is continuously connected with another output such as the final drive unit or transfer case (not shown).

The torque-transmitting mechanisms, including the first, second, and third clutches 326, 328, 330 and the first, second, third, and fourth brakes 332, 334, 336, 338 allow for selective interconnection of the shafts or interconnecting members 342, 344, 346, 348, 352, 354, 356 of the planetary gear sets 314A-C, 316A-C, 318A-C, 320A-C, and the housing 350.

For example, the first clutch 326 is selectively engageable to connect the input shaft or member 22B with the fourth shaft or interconnecting member 348. The second clutch 328 is selectively engageable to connect the input shaft 22B with the third shaft or interconnecting member 346. The third clutch 330 is selectively engageable to connect the fifth shaft or interconnecting member 352 with the sixth shaft or interconnecting member 354.

The first brake 332 is selectively engageable to connect the fourth shaft or interconnecting member 348 with the stationary element or the transmission housing 350 in order to restrict the member 348 from rotating relative to the transmission housing 350. The second brake 334 is selectively engageable to connect the fifth shaft or interconnecting member 352 with the stationary element or the transmission housing 350 in order to restrict the member 352 from rotating relative to the transmission housing 350. The third brake 336 is selectively engageable to connect the first shaft or interconnecting member 342 with the stationary element or the transmission housing 350 in order to restrict the member 342 from rotating relative to the transmission housing 350. The fourth brake 338 is selectively engageable to connect the seventh shaft or interconnecting member 356 with the stationary element or the transmission housing 350 in order to restrict the member 356 from rotating relative to the transmission housing 350. In turn, the gear elements connected to each of the connecting members are also connected or restricted accordingly.

Figures 11, 12:
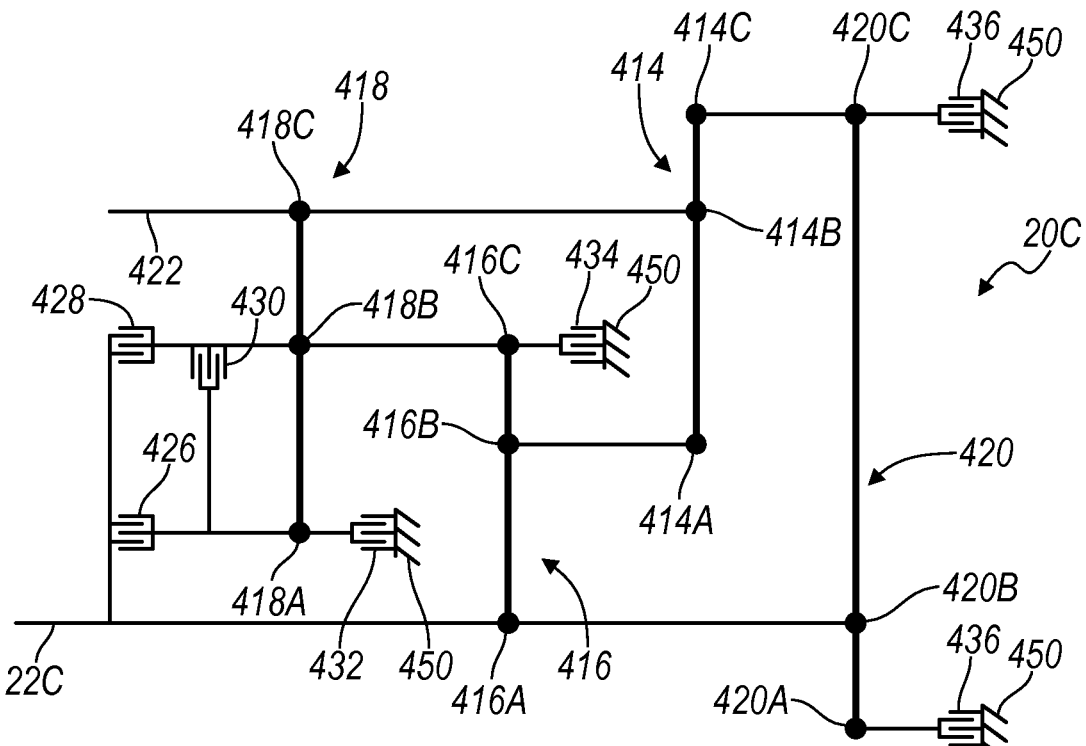
FIG. 11 is a truth table presenting an example of a state of engagement of various torque transmitting elements in forward and reverse speeds or gear ratios of the transmission illustrated in FIGS. 9-10.
FIG. 12 is a lever diagram of yet another embodiment of a transmission according to the principles of the present invention.

Referring now to FIGS. 10-11, the operation of the embodiment of the transmission 20B' will be described. It will be appreciated that transmission 20B' is capable of transmitting torque from the input shaft or member 22B to the output shaft or member 322 in eleven, twelve, or more forward speed torque ratios and at least one reverse speed or torque ratio. Each forward and reverse speed or torque ratio is attained by engagement of one or more of the torque-transmitting mechanisms (i.e. first clutch 326, second clutch 328, third clutch 330, first brake 332, second brake 334, third brake 336, and fourth brake 338), as will be explained below. FIG. 11 is a truth table presenting an example of various combinations of torque-transmitting mechanisms that are activated or engaged to achieve the various gear states. Of course, other gear ratios are achievable depending on the gear diameter, gear teeth count and gear configuration selected.

For example to establish a reverse gear, the first clutch 326 and the second brake 334 are engaged or activated. The first clutch 326 connects the transmission input shaft 22B with the fourth shaft or interconnecting member 348. The second brake 334 connects the fifth shaft or interconnecting member 352 with the stationary element or the transmission housing 350 in order to restrict the member 352 from rotating relative to the transmission housing 350, which restricts the third planetary carrier member 318B and the second ring gear member 316C from rotating relative to the transmission housing 350. Likewise, twelve forward ratios are achieved through different combinations of clutch and brake engagement, as shown in FIG. 11, by way of example.

Referring now to FIG. 12, another embodiment of a twelve speed transmission 20 is illustrated in a lever diagram format and labeled as transmission 20C to designate that this is another variation of the transmission 20 of FIG. 1. The transmission 20C includes the transmission input shaft 22C, a first planetary gear set 414, a second planetary gear set 416, a third planetary gear set 418, a fourth planetary gear set 420, and an output shaft or member 422. Like the lever diagrams described above, in the lever diagram of FIG. 12, each of the planetary gear sets 414, 416, 418, 420 have first, second, and third nodes 414A-C, 416A-C, 418A-C, 420A-C.

The input member 22C is continuously coupled to the first node 416A of the second planetary gear set 416 and the second node 420B of the fourth planetary gear set 420. The output member 422 is continuously coupled to the third node 418C of the third planetary gear set 418 and the second node 414B of the first planetary gear set 414. The first node 414A of the first planetary gear set 414 is coupled to the second node 416B of the second planetary gear set 416. The second node 414B of the first planetary gear set 414 is coupled to the third node 418C of the third planetary gear set 418. The third node 414C of the first planetary gear set 414 is coupled to the third node 420C of the fourth planetary gear set 420.

The first node 416A of the second planetary gear set 416 is coupled to the second node 420B of the fourth planetary gear set 420. The third node 416C of the second planetary gear set 416 is coupled to second node 418B of the third planetary gear set 418.

A first clutch 426 selectively connects the input member or shaft 22C, the first node 416A of the second planetary gear set 416, and the second node 420B of the fourth planetary gear set 420 with the first node 418A of the third planetary gear set 418. A second clutch 428 selectively connects the input shaft 22C, the first node 416A of the second planetary gear set 416, and the second node 420B of the fourth planetary gear set 420 with the second node 418B of the third planetary gear set 418 and the third node 416C of the second planetary gear set 416. A third clutch 430 selectively connects the first node 418A of the third planetary gear set 418 with the second node 418B of the third planetary gear set 418 and the third node 416C of the second planetary gear set 416.

A first brake 432 selectively connects the first node 418A of the third planetary gear set 418 with a stationary member or transmission housing 450. A second brake 434 selectively connects the third node 416C of the second planetary gear set 416 and the second node 418B of the third planetary gear set 418 with the stationary member or transmission housing 450. A third brake 436 selectively connects the third node 414C of the first planetary gear set 414 and the third node 420C of the fourth planetary gear set 420 with the stationary member or transmission housing 450. A fourth brake 438 selectively connects the first node 420A of the fourth planetary gear set 420 with the stationary member or transmission housing 450.

Figures 13, 14:
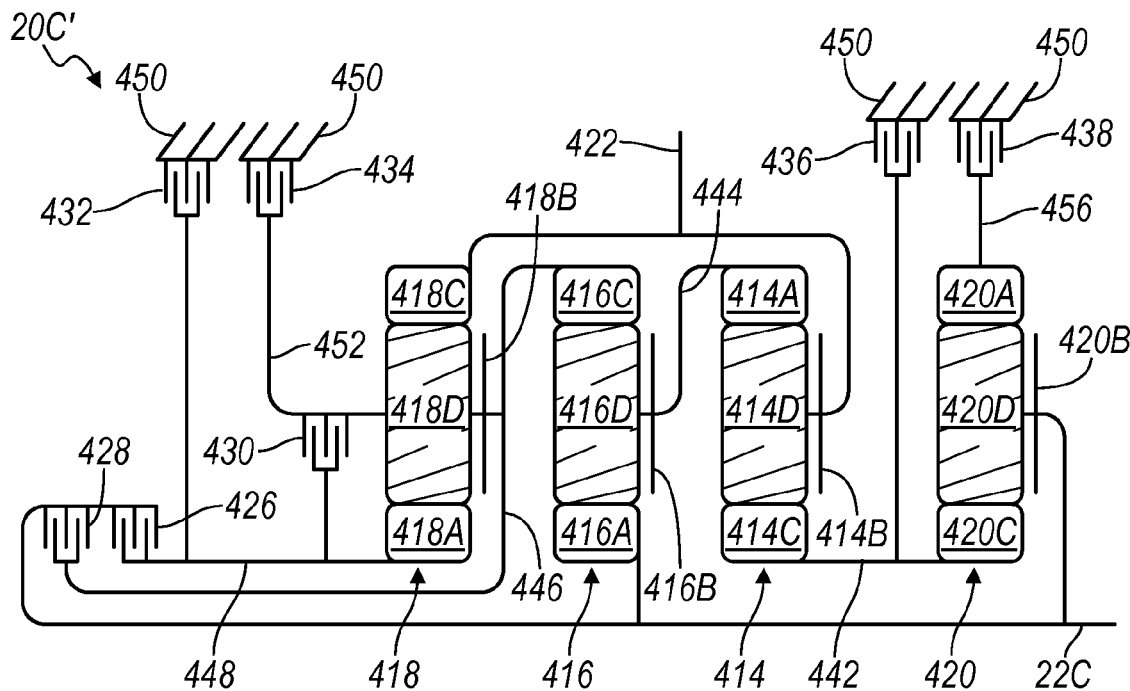
FIG. 13 is a diagrammatic illustration of a variation of the transmission of FIG. 12 according to the principles of the present invention.
FIG. 14 is a truth table presenting an example of a state of engagement of various torque transmitting elements in forward and reverse speeds or gear ratios of the transmission illustrated in FIGS. 12-13.

Referring now to FIG. 13, a stick diagram presents a schematic layout of an embodiment of the twelve speed transmission 20C of FIG. 12, according to one form of the present invention, which is labeled as transmission 20C' to indicate that transmission 20C' is one possible embodiment of transmission 20C. It should be understood that alternatively, other different stick diagrams could be used in conjunction with the lever diagram FIG. 12. In FIG. 13, the numbering from the lever diagram of FIG. 12 is carried over. The clutches and couplings are correspondingly presented whereas the nodes of the planetary gear sets now appear as components of planetary gear sets such as sun gears, ring gears, planet gears and planet gear carriers.

For example, like the stick diagrams previously described, the stick diagram in FIG. 13 includes a first, second, third, and fourth planetary gear sets 414, 416, 418, 420, wherein each includes a sun gear member 414C, 416A, 418A, 420C, a planet carrier member 414B, 416B, 418B, 420B having planet gears 414D, 416D, 418D, 420D, and a ring gear member 414A, 416C, 418C, 420A. The planet gears 414D, 416D, 418D, 420D intermesh with both a sun gear member 414C, 416A, 418A, 420C and a ring gear member 414A, 416C, 418C, 420A, respectively. Each of the planetary gear sets 414, 416, 418, 420 are simple planetary gear sets in this variation, but in other variations of the present invention, one or more of the planetary gear sets 414, 416, 418, 420 could be compound planetary gear sets. The output shaft or member 422 is continuously connected with another output.

The first sun gear member 414C is connected for common rotation with a first shaft or interconnecting member 442. The first ring gear member 414A is connected for common rotation with a second shaft or interconnecting member 444. The first planet carrier member 414B is connected for common rotation with the output shaft or member 422.

The second sun gear member 416A is connected for common rotation with the input shaft or member 22C. The second planet carrier member 416B is connected for common rotation with the second shaft or interconnecting member 444. The second ring gear member 416C is connected for common rotation with a third shaft or interconnecting member 446.

The third sun gear member 418A is connected for common rotation with a fourth shaft or interconnecting member 448. The third ring gear member 418C is connected for common rotation with the output shaft or member 422. The third planet carrier member 418B is connected for common rotation with the third shaft or interconnecting member 446 and a fifth shaft or interconnecting member 452.

The fourth sun gear member 420C is connected for common rotation with the first shaft or interconnecting member 442. The fourth ring gear member 420A is connected for common rotation with a sixth shaft or interconnecting member 456. The fourth planetary gear carrier member 420B is connected for common rotation with the input shaft or member 22C.

The torque-transmitting mechanisms, including the first, second, and third clutches 426, 428, 430 and the first, second, third, and fourth brakes 432, 434, 436, 438 allow for selective interconnection of the shafts or interconnecting members, members of the planetary gear sets and the housing. For example, the first clutch 426 is selectively engageable to connect the transmission input shaft 22C with the fourth shaft or interconnecting member 448. The second clutch 428 is selectively engageable to connect the input shaft 22C with the third shaft or interconnecting member 446. The third clutch 430 is selectively engageable to connect the fifth shaft or interconnecting member 452 with the fourth shaft of interconnecting member 448.

The first brake 432 is selectively engageable to connect the fourth shaft or interconnecting member 448 with the stationary element or the transmission housing 450. The second brake 434 is selectively engageable to connect the fifth shaft or interconnecting member 452 with the stationary element or the transmission housing 450. The third brake 436 is selectively engageable to connect the first shaft or interconnecting member 442 with the stationary element or the transmission housing 450. The fourth brake 438 is selectively engageable to connect the sixth shaft or interconnecting member 456 with the stationary element or the transmission housing 450.

Referring now to FIGS. 13-14, the operation of the illustrated embodiment of the transmission 20C' will be described. The transmission 20C' is capable of transmitting torque from the transmission input shaft 22C to the output shaft or member 422 in eleven, twelve, or more forward speed torque ratios and at least one reverse speed or torque ratio. Each forward and reverse speed or torque ratio is attained by engagement of one or more of the torque-transmitting mechanisms (i.e. first clutch 426, second clutch 428, third clutch 430, first brake 432, second brake 434, third brake 436, and fourth brake 438), as will be explained below.

FIG. 14 is a truth table presenting an example of various combinations of torque-transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 20C'. Of course, other gear ratios are achievable depending on the gear diameter, gear teeth count and gear configuration selected.

For example to establish a reverse gear, the first clutch 426 and the second brake 434 are engaged or activated. The first clutch 426 connects the input shaft 22C with the fourth shaft or interconnecting member 448. The second brake 434 connects the fifth shaft or interconnecting member 452 with the stationary element or the transmission housing 450 in order to restrict the member 452 from rotating relative to the transmission housing 450, which also restricts the third planetary carrier member 418B and the second ring gear member 416C from rotating relative to the transmission housing 450. Likewise, twelve forward ratios may be achieved through different combinations of clutch and brake engagement, as shown in FIG. 14.

It will be appreciated that the foregoing explanation of operation and gear states of the transmission assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission assembly for use in a motor vehicle, the transmission assembly comprising:
    a transmission having a case for housing components of the transmission;
    first, second, third and fourth planetary gear sets rotatably supported within the case and wherein each planetary gear set has first, second and third members;
    a transmission shaft rotatably supported within the case, the transmission shaft configured to be connected to an engine of the motor vehicle and directly connected for common rotation with the second member of the fourth planetary gear set;
    an electromechanical device disposed in the case, the electromechanical device operable to convert mechanical energy to electrical energy, and wherein the electromechanical device is operable to start an engine of the motor vehicle and the transmission shaft being operable as an input to the transmission and as an output from the transmission to the engine;
    a connecting device continuously interconnecting the electromechanical device with the transmission shaft
    an output member directly connected for common rotation with the second member of the first planetary gear set;
    a first interconnecting member continuously interconnecting the third member of the first planetary gear set with the third member of the fourth planetary gear set;
    a second interconnecting member continuously interconnecting the second member of the first planetary gear set with the third member of the third planetary gear set;
    a third interconnecting member continuously interconnecting the first member of the first planetary gear set with the second member of the second planetary gear set;
    a fourth interconnecting member continuously interconnecting the third member of the second planetary gear set with the second member of the third planetary gear set;
    a fifth interconnecting member continuously interconnecting the first member of the second planetary gear set with the second member of the fourth planetary gear set;
    six torque transmitting mechanisms each selectively engageable to interconnect at least one of the first, second, and third members with at least one other of the first, second, third members and a stationary member, and
    wherein the six torque transmitting mechanisms are selectively engageable in combinations of at least two to establish at least ten forward speed ratios and at least one reverse speed ratio between the transmission shaft and the output member, and wherein the transmission shaft is configured as an input to the transmission to supply torque from the engine to the transmission.

2. The transmission assembly of claim 1, further comprising a rotatable device shaft extending from the electromechanical device, wherein the connecting device is a chain that connects the device shaft to the transmission shaft.

3. The transmission assembly of claim 1, wherein the electromechanical device operates as an alternator, an engine starter, and a regenerative braking generator.

4. The transmission assembly of claim 2, wherein the electromechanical device is configured to be cooled with automatic transmission fluid.

5. The transmission assembly of claim 4 wherein the case includes a main housing portion and a bell housing, the electromechanical device being fixed within the main housing portion of the case.

6. The transmission assembly of claim 1 wherein a first of the six torque transmitting mechanisms is selectively engageable to interconnect the first member of the third planetary gear set with the transmission shaft, the first member of the second planetary gear set and the second member of the fourth planetary gear set; wherein a second of the six torque transmitting mechanisms is selectively engageable to interconnect the third member of the second planetary gear set and the second member of the third planetary gear set with the transmission shaft, the first member of the second planetary gear set and the second member of the fourth planetary gear set; wherein a third of the six torque transmitting mechanisms is selectively engageable to interconnect the first member of the third planetary gear set with the stationary member; wherein a fourth of the six torque transmitting mechanisms is selectively engageable to interconnect the second member of the third planetary gear set and the third member of the second planetary gear set with the stationary member; wherein a fifth of the six torque transmitting mechanisms is selectively engageable to interconnect the third member of the first planetary gear set and the third member of the fourth planetary gear set with the stationary member; and wherein a sixth of the six torque transmitting mechanisms is selectively engageable to interconnect the first member of the fourth planetary gear set with the stationary member.

7. The transmission assembly of claim 6 wherein the transmission shaft is continuously connected for common rotation with the first member of the second planetary gear set and the second member of the fourth planetary gear set; and wherein the output member is continuously connected for common rotation with the second member of the first planetary gear set and to third member of the third planetary gear set.

8. The transmission assembly of claim 7 wherein the third member of the first planetary gear set, the third member of the fourth planetary gear set, the first member of the second planetary gear set, and the first member of the third planetary gear set are sun gear members; wherein the second members of the first, second, third and fourth planetary gear sets are planet gear carrier members; and wherein the first member of the first planetary gear set, the first member of the fourth planetary gear set, the third member of the second planetary gear set, and the third member of the third planetary gear set are ring gear members.

9. A transmission comprising:
    an electromechanical device operable as an alternator, an engine starter, and a regenerative braking generator;

a rotating device shaft extending from the electromechanical device;

a transmission case including a main housing portion and a bell housing, the electromechanical device being fixed within the main housing portion of the transmission case;

a transmission shaft rotatably supported within the case, the transmission shaft configured to be connected to an engine of a motor vehicle, the transmission shaft operable as an input to the transmission and as an output from the transmission to the engine;

a connecting device continuously interconnecting the device shaft with the transmission shaft, an output member;

first, second, third and fourth planetary gear sets each having first, second and third members;

a first interconnecting member continuously interconnecting the first member of the first planetary gear set with the second member of the second planetary gear set;

a second interconnecting member continuously interconnecting the second member of the first planetary gear set with the third member of the third planetary gear set;

a third interconnecting member continuously interconnecting the third member of the first planetary gear set with the third member of the fourth planetary gear set;

a fourth interconnecting member continuously interconnecting the first member of the second planetary gear set with the second member of the fourth planetary gear set;

a fifth interconnecting member continuously interconnecting the third member of the second planetary gear set with the second member of the third planetary gear set; and six torque transmitting mechanisms each selectively engageable to interconnect at least one of the first, second, and third members with at least one other of the first, second, third members and a stationary member, and wherein the six torque transmitting mechanisms are selectively engageable in combinations of at least two to establish at least ten forward speed ratios and at least one reverse speed ratio between the transmission shaft and the output member, the transmission shaft is configured as an input to the transmission to supply torque from the engine to the transmission, and wherein the electromechanical device is configured to be cooled with automatic transmission fluid.

10. The transmission assembly of claim 9 wherein a first of the six torque transmitting mechanisms is selectively engageable to interconnect the first member of the third planetary gear set with the transmission shaft, the first member of the second planetary gear set and the second member of the fourth planetary gear set; wherein a second of the six torque transmitting mechanisms is selectively engageable to interconnect the third member of the second planetary gear set and the second member of the third planetary gear set with the transmission shaft, the first member of the second planetary gear set and the second member of the fourth planetary gear set; wherein a third of the six torque transmitting mechanisms is selectively engageable to interconnect the first member of the third planetary gear set with the stationary member; wherein a fourth of the six torque transmitting mechanisms is selectively engageable to interconnect the second member of the third planetary gear set and the third member of the second planetary gear set with the stationary member; wherein a fifth of the six torque transmitting mechanisms is selectively engageable to interconnect the third member of the first planetary gear set and the third member of the fourth planetary gear set with the stationary member; and wherein a sixth of the six torque transmitting mechanisms is selectively engageable to interconnect the first member of the fourth planetary gear set with the stationary member.

11. The transmission assembly of claim 10 wherein the transmission shaft is continuously connected for common rotation with the first member of the second planetary gear set and the second member of the fourth planetary gear set; and wherein the output member is continuously connected for common rotation with the second member of the first planetary gear set and to third member of the third planetary gear set.

12. The transmission assembly of claim 11 wherein the third member of the first planetary gear set, the third member of the fourth planetary gear set, the first member of the second planetary gear set, and the first member of the third planetary gear set are sun gear members; wherein the second members of the first, second, third and fourth planetary gear sets are planet gear carrier members; and wherein the first member of the first planetary gear set, the first member of the fourth planetary gear set, the third member of the second planetary gear set, and the third member of the third planetary gear set are ring gear members.

* * * * *